(12) United States Patent
Yang et al.

(10) Patent No.: US 9,273,509 B2
(45) Date of Patent: Mar. 1, 2016

(54) SELF-ENHANCEMENT PLASTIC PROFILE AND PRODUCTION METHOD THEREOF

(71) Applicant: DALIAN SHIDE SCIENCE & TECHNOLOGY DEVELOPMENT CO., LTD., Dalian, Liaoning (CN)

(72) Inventors: Feihu Yang, Liaoning (CN); Xiansheng Cheng, Liaoning (CN); Feng Jiang, Liaoning (CN); Huaijin Fan, Liaoning (CN); Hongrong Zhou, Liaoning (CN); Zhijun Yin, Liaoning (CN)

(73) Assignee: DALIAN SHIDE SCIENCE & TECHNOLOGY DEVELOPMENT CO., LTD., Dalian, Liaoning (CN)

( * ) Notice: Subject to any disclaimer, the term of this patent is extended or adjusted under 35 U.S.C. 154(b) by 0 days.

(21) Appl. No.: 14/418,047

(22) PCT Filed: Aug. 14, 2013

(86) PCT No.: PCT/CN2013/081474
§ 371 (c)(1),
(2) Date: Jan. 28, 2015

(87) PCT Pub. No.: WO2014/032524
PCT Pub. Date: Mar. 6, 2014

(65) Prior Publication Data
US 2015/0191961 A1    Jul. 9, 2015

(30) Foreign Application Priority Data

Aug. 30, 2012  (CN) .......................... 2012 1 0316048

(51) Int. Cl.
*B29C 47/04*    (2006.01)
*B29C 47/06*    (2006.01)
(Continued)

(52) U.S. Cl.
CPC ................. *E06B 1/28* (2013.01); *B29C 47/003* (2013.01); *B29C 47/0009* (2013.01);
(Continued)

(58) Field of Classification Search
None
See application file for complete search history.

(56) References Cited

U.S. PATENT DOCUMENTS 4,310,451 A * 1/1982 Ernest .................... C08K 5/053
                                                          524/388
4,514,449 A * 4/1985 Budich et al. ................... 428/76
(Continued)

FOREIGN PATENT DOCUMENTS

CN       2608647 Y       3/2004
CN       1900153 A  *    1/2007
(Continued)

*Primary Examiner* — Vivian Chen
(74) *Attorney, Agent, or Firm* — Novick, Kim & Lee, PLLC; Allen Xue

(57) ABSTRACT

The present invention provides a self-enhancement plastic profile and a production method thereof. The self-enhancement plastic profile is made by co-extrusion a substrate resin and a PBT resin containing fiber glass. The production method of the self-enhancement plastic profile is that: melting and co-extrusion of the substrate resin and the PBT resin containing fiber glass. Infrastructures comprise a main engine and an auxiliary engine vertically arranged to the main engine. The main engine processes the PVC substrate (1), the auxiliary engine processes an enhancement bar (2) of the PBT resin containing fiberglass, the raw materials are extruded by the main engine and the auxiliary engine at the same and the extrudate is pre-profiled, and subjected to cold cutting and sized. The enhancement bar (2) is made by blending the fiberglass with the polybutylene terephthalate (PBT) plastic. The self-enhancement plastic profile has advantages of simple, convenient and quick installation and convenient to produce.

1 Claim, 2 Drawing Sheets

(51) Int. Cl.
| | |
|---|---|
| B32B 27/18 | (2006.01) |
| B32B 27/20 | (2006.01) |
| B32B 27/30 | (2006.01) |
| B32B 27/36 | (2006.01) |
| B32B 37/15 | (2006.01) |
| C08K 3/00 | (2006.01) |
| C08K 5/00 | (2006.01) |
| C08L 27/06 | (2006.01) |
| C08L 67/02 | (2006.01) |
| C08L 67/03 | (2006.01) |
| C08L 23/08 | (2006.01) |
| C08L 33/06 | (2006.01) |
| E06B 1/28 | (2006.01) |
| E06B 3/22 | (2006.01) |
| E06B 1/30 | (2006.01) |
| B29C 47/56 | (2006.01) |
| B29C 47/10 | (2006.01) |
| B29C 47/12 | (2006.01) |
| B29C 47/82 | (2006.01) |
| B29C 47/92 | (2006.01) |
| B32B 38/00 | (2006.01) |
| B29C 47/00 | (2006.01) |
| B29K 27/06 | (2006.01) |
| B29K 67/00 | (2006.01) |
| B29K 309/08 | (2006.01) |

(52) U.S. Cl.
CPC ........ *B29C 47/0016* (2013.01); *B29C 47/0019* (2013.01); *B29C 47/0066* (2013.01); *B29C 47/04* (2013.01); *B29C 47/1045* (2013.01); *B29C 47/128* (2013.01); *B29C 47/56* (2013.01); *B29C 47/827* (2013.01); *B29C 47/92* (2013.01); *E06B 1/30* (2013.01); *E06B 3/221* (2013.01); *B29C 47/0023* (2013.01); *B29C 47/0064* (2013.01); *B29C 47/06* (2013.01); *B29C 47/065* (2013.01); *B29C 2947/9259* (2013.01); *B29C 2947/92209* (2013.01); *B29C 2947/92514* (2013.01); *B29C 2947/92704* (2013.01); *B29K 2027/06* (2013.01); *B29K 2067/006* (2013.01); *B29K 2309/08* (2013.01); *B32B 27/18* (2013.01); *B32B 27/20* (2013.01); *B32B 27/304* (2013.01); *B32B 27/36* (2013.01); *B32B 37/15* (2013.01); *B32B 37/153* (2013.01); *B32B 38/0004* (2013.01); *B32B 2250/02* (2013.01); *B32B 2250/24* (2013.01); *B32B 2262/101* (2013.01); *B32B 2309/02* (2013.01); *B32B 2327/06* (2013.01); *B32B 2367/00* (2013.01); *B32B 2419/00* (2013.01); *C08K 3/0008* (2013.01); *C08K 5/0008* (2013.01); *C08L 23/0892* (2013.01); *C08L 27/06* (2013.01); *C08L 33/06* (2013.01); *C08L 67/02* (2013.01); *C08L 67/03* (2013.01); *E06B 2003/228* (2013.01); *Y10T 428/1314* (2015.01); *Y10T 428/24628* (2015.01); *Y10T 428/31786* (2015.04); *Y10T 428/31797* (2015.04); *Y10T 428/31935* (2015.04)

(56) References Cited

U.S. PATENT DOCUMENTS

| | | | | |
|---|---|---|---|---|
| 4,728,677 | A | * | 3/1988 | Lacatus et al. ................ 523/135 |
| 5,030,676 | A | * | 7/1991 | Wallen .......................... 524/182 |
| 5,538,777 | A | * | 7/1996 | Pauley ................... B29C 44/22 296/93 |
| 5,587,419 | A | * | 12/1996 | Lawson et al. ................ 524/527 |
| 5,985,959 | A | * | 11/1999 | Harvey et al. .................... 524/84 |
| 2003/0157280 | A1 | * | 8/2003 | Boissonnat et al. .......... 428/34.1 |
| 2004/0198909 | A1 | * | 10/2004 | Breitscheidel et al. ....... 525/165 |
| 2004/0255527 | A1 | * | 12/2004 | Chen ............................. 52/204.1 |
| 2009/0306257 | A1 | * | 12/2009 | Wehner et al. ................ 524/100 |
| 2010/0319843 | A1 | * | 12/2010 | Wust et al. ................. 156/244.13 |
| 2014/0113155 | A1 | * | 4/2014 | Kim ...................... B29C 47/046 428/522 |

FOREIGN PATENT DOCUMENTS

| | | |
|---|---|---|
| CN | 201133186 Y | 10/2008 |
| CN | 201447999 U | 5/2010 |
| CN | 201714232 U | 1/2011 |
| CN | 102817529 A | 12/2012 |
| CN | 103075071 A | 5/2013 |
| DE | 202011003572 U1 | 10/2011 |
| JP | 08-183138 | * 7/1996 |
| KR | 10-2012-0139156 | * 12/2012 |
| WO | 2009024264 A1 | 2/2009 |

* cited by examiner

SELF-ENHANCEMENT PLASTIC PROFILE AND PRODUCTION METHOD THEREOF

FIELD OF THE INVENTION

The present invention relates to a patent classification No. C08: organic high molecular compound; preparation or chemical processing of the organic high molecular compound; and a composition taking the organic high molecular compound as a substrate.

BACKGROUND OF THE INVENTION

Doors and windows on a building sustain the influences from the environment which are mainly wind pressure and invasion of rain and snow, and also sustain the opening and closing force while in use as well as self gravity. The wind force is the main reason that enables the rod pieces (cross bar, vertical stile and window lattice serving as lattice profiles), frames and sashes to bend and deform. Safety of the doors and windows are mainly decided by the ability of the doors and windows for sustaining the wind force, and is usually measured according to the gas pressure value sustained in unit area.

The mechanical properties of rigid PVC plastic which is namely a PVC profile is far poorer than that of steel, aluminum and wood. Particularly, the bending strength of the PCV profile is only ¼ of that of the wood product, ½8 of that of the aluminum product and ¹⁄84 of that of the steel product; under the same section shape and size, the bending property of the PVC profiled bar is much poorer than that of the aluminum profiled bar and the steel profiled bar. In order to makeup this defect, one important measure is to additionally arrange steel enhancement profiled bar which is namely a steel lining in the empty cavity of the PVC profile.

Additionally arranging the steel lining can solve the problem of insufficient intensity of the PVC profile, but also brings some negative defects.

Usually, the steel linings and the PVC profiles are separately stored. When installing the doors and windows, the installation personnel needs to fix the steel linings and the PVC profiles in the job site, thus increasing the assembling procedure of installing the doors and windows. Moreover, the site installation personnel need to have corresponding technologies and proficiency. Consumption of a number of steel products causes severe wastes inevitably. Moreover, there are certain requirements for storage and transportation of the steel products, for example, attention needs to be paid to water prevention, keeping cleanness of the steel products, and keeping far away from articles having corrosion effect, and the like. More importantly, because the steel lining is metal which is a good conductor of heat, the heat transfer coefficient of the PVC doors and windows is increased, and the thermal insulation performance of the PVC doors and windows is reduced, which is not beneficial for thermal insulation and energy conservation.

SUMMARY OF THE INVENTION

Due to the adoption of the technical scheme, this invention provides a self-enhancement plastic profile, comprising: a plastic profile substrate and at least one enhancement bar integrally formed with the plastic profile substrate to increase the intensity of the profile.

The enhancement bar is arranged inside the profile substrate.

The enhancement bar is a PBT resin added with fiberglass.

The self-enhancement plastic profile is made by co-extrusion of a substrate resin with a PBT resin containing fiberglass, wherein the composition of the substrate resin is:

| raw material name | mass fraction |
|---|---|
| PVC | 100 |
| stabilizer | 3-8 |
| modifier | 4-11 |
| stain | 3-6 |
| filler | 5-10 |
| processing agent | 1-4 |
| pigment | 0.015-0.045 | wherein, the stabilizer is a lead based stabilizer, a calcium/zinc stabilizer or an organic tin stabilizer; the modifier is a CPE modifier or an acrylic ester modifier; the stain is titanium dioxide; the filler is kaolin, wollastonite, calcium carbonate or talc powder; the processing agent is acrylic ester; and the pigment is ultramarine or phthalocyanine blue;

the PBT resin containing fiberglass is made by blending the fiberglass with the PBT material, wherein the raw materials and proportion compositions of the PBT resin are:

| raw material name | mass ratio (%) |
|---|---|
| PBT material | 45-75 |
| enhanced fiberglass | 25-55 |

A method for producting the self-enhancement plastic profile, wherein the self-enhancement plastic profile is made by melting and co-extrusion of a substrate resin with the PBT resin containing fiberglass; the raw material formulation of the substrate is:

| raw material name | mass fraction |
|---|---|
| PVC | 100 |
| stabilizer | 3-8 |
| modifier | 4-11 |
| stain | 3-6 |
| filler | 5-10 |
| processing agent | 1-4 |
| pigment | 0.015-0.045 |

The main raw materials of an intermediate enhancement material co-extrusion layer and their proportions are:

| raw material name | mass ratio (%) |
|---|---|
| PBT material | 45-75 |
| enhanced fiberglass | 25-55 |

The production process is that: infrastructures comprise a main engine and an auxiliary engine vertically arranged to the main engine; the PVC profile is processed by the main engine; the enhancement bar of the PBT resin containing fiberglass is processed by the auxiliary engine; the raw materials are extruded by the main engine and the auxiliary engine at the same, the extrudate is pre-profiled and subjected to cold cutting and sized; the enhancement bar is made by blending the fiberglass with PBT plastic.

The main engine is a double screw plastic extruder, wherein the inside of the extruder has six heating zones: the heating temperatures of each heating zone are respectively that:

zone I: 172-176° C., zone II: 175-180° C., zone III: 176-183° C., zone IV: 182-187° C., zone V: 184-190° C., zone VI: 172-176° C.;

the temperature in adapter is 185-195° C.;

the rotating speed of an extrusion screw in the main engine is 7-9 rpm, and the rotating speed of a feeding screw is 18-25 rpm, the torque is: 32-39%, and the melting pressure is 310-330 bar.

The auxiliary engine is a single screw plastic extruder;

The auxiliary engine has three heating zones, wherein the heating temperatures of each heating zone are respectively: zone I: 220-240° C., zone II: 220-240° C., zone III: 220-240° C.;

the temperature in adapter is 220-240° C.;

The auxiliary engine has two co-extrusion heads in total, wherein the heating temperature of the co-extrusion head I is 220-240° C., and the heating temperature of the co-extrusion head II is 220-240° C.; temperature parameters of a die head: zone I: 185-200° C., zone II: 185-200° C., zone III: 185-200° C., and zone IV: 185-200° C.

Because the foregoing technical solution is adopted, the self-enhancement plastic profile provided by the present invention is a plastic profile having the advantages of simple, convenient and quick installation, low requirement on the technical proficiency of the site installation personnel, convenience in storage, better heat insulation performance, energy conservation and environment protection. The self-enhancement plastic profile not only is convenient to produce, but also has a very low cost and is suitable for wide popularization.

BRIEF DESCRIPTION OF THE DRAWINGS

In order to illustrate the technical solutions in the embodiments of the present invention or the prior art more clearly, the accompanying drawings used in the descriptions of the embodiments or the prior art will be described simply hereunder. Apparently, the accompanying drawings described hereunder are merely some embodiments of the present invention. Those having ordinary skills in the art may also figure out other accompanying drawings according to the accompanying drawings without going through any creative work.

Figure 1:
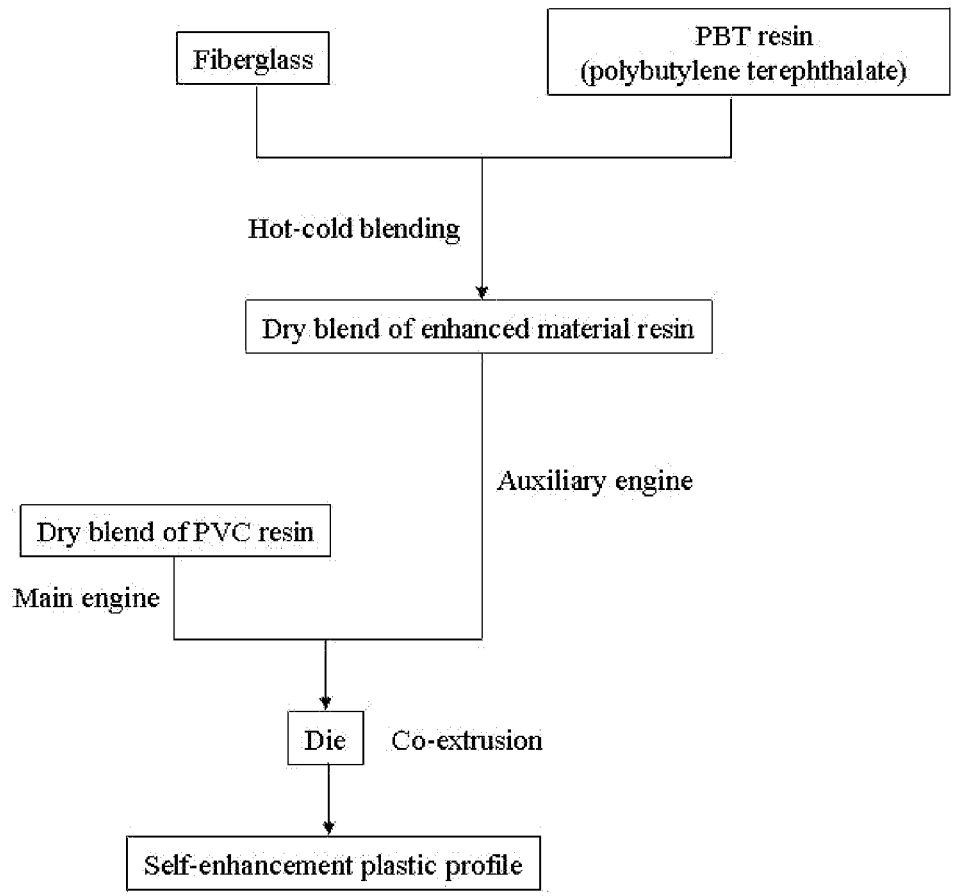
FIG. 1 is a flow schematic view of a production process according to the present invention.
Figure 2:
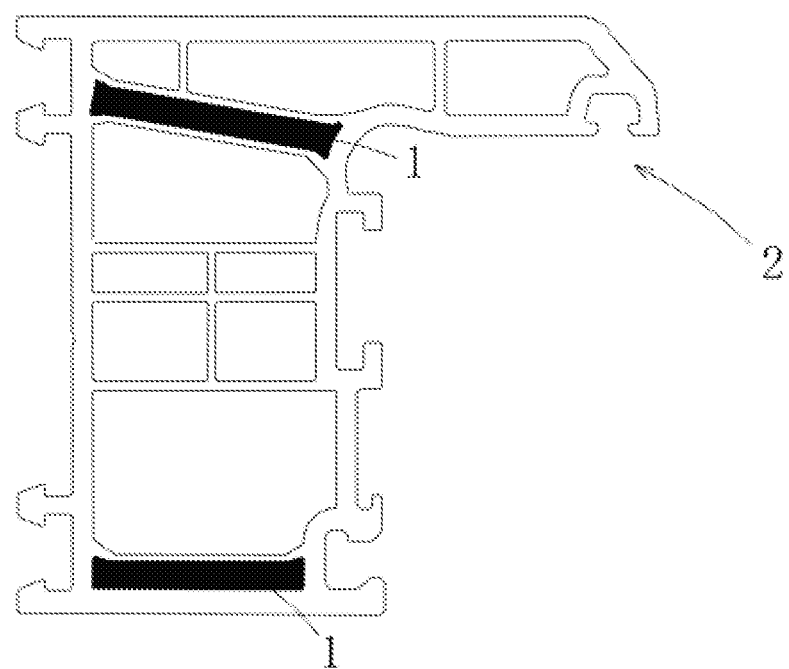
FIG. 2 is a sectional view of a profile produced according to the present invention.

In the drawings, 1 refers to a substrate and 2 refers to an enhancement material co-extrusion layer.

DETAILED DESCRIPTION OF PREFERRED EMBODIMENTS

To make the objective, technical solution and advantages of the present invention more clear, the technical solution in the embodiments of the present invention is further described in details by reference to the drawings and embodiments hereunder.

The sections of the profiled bars produced in each embodiment are as shown in FIG. 1.

Embodiment 1

The raw materials of the base material with PVC as a main part and their proportions are as follows:

| Raw material name | Mass fraction |
|---|---|
| PVC | 100 |
| Stabilizer | 5 |
| Modifier | 7 |
| Stain | 4 |
| Filler | 9 |
| Processing agent | 1 |
| Pigment | 0.02 |

The main raw materials of intermediate enhancement material co-extrusion layer and their proportions are as follows:

| Raw material name | Mass ratio (%) |
|---|---|
| PBT material | 71 |
| Enhanced fiberglass | 29 |

The stabilizer is a lead based stabilizer or a calcium/zinc stabilizer; the modifier is acrylic ester; the stain is titanium dioxide; the filler is calcium carbonate or wollastonite; the processing agent is acrylic ester; and the pigment is ultramarine.

The main engine is a double screw plastic extruder, wherein the extruder has six heating zones and an adapter, and the working temperatures of each heating zone and the adapter are as follows:

| Heating zone | Temperature (degree celsius ° C.) |
|---|---|
| Zone I | 175 |
| Zone II | 177 |
| Zone III | 180 |
| Zone IV | 186 |
| Zone V | 184 |
| Zone VI | 176 |
| Adapter | 190 |

The rotating speed of an extrusion screw in the main engine is 7 rpm, and the rotating speed of a feeding screw is 18 rpm, the torque is 32%, and the melting pressure is 310 bar.

The auxiliary engine is a single screw plastic extruder, and the auxiliary engine has three heating zones, two co-extrusion heads and one die head, wherein:

temperature of zone I is 220° C., the temperature of zone II is 220° C., the temperature of zone III is 220° C.; the temperature of the adapter is 220° C.

The auxiliary engine has two co-extrusion heads in total, wherein the heating temperature of the co-extrusion head I is 220° C., and the heating temperature of the co-extrusion head II is: 220° C. Temperature parameters of the die head are that: the temperature of zone I is 185° C., the temperature of zone II is 190° C., the temperature of zone III is 190° C., and the temperature of zone IV is 190° C.

Embodiment 2

The raw materials of base material with PVC as a main part and their proportions are as follows:

| Raw material name | Mass fraction |
| --- | --- |
| PVC | 100 |
| Stabilizer | 6 |
| Modifier | 9 |
| Stain | 6 |
| Filler | 7 |
| Processing agent | 2 |
| Pigment | 0.03 |

The main raw materials of an intermediate enhancement material co-extrusion layer and their proportions are as follows:

| Raw material name | Mass ratio (%) |
| --- | --- |
| PBT material | 68 |
| Enhanced fiberglass | 32 |

The stabilizer is a lead based stabilizer or a calcium/zinc stabilizer; the modifier is acrylic ester, the stain is titanium dioxide; the filler is calcium carbonate or wollastonite; the processing agent is acrylic ester; and the pigment is ultramarine.

The main engine is a double screw plastic extruder, wherein the extruder has six heating zones and an adapter, and the working temperatures of each heating zone and the adapter are as follows:

| Heating zone | Temperature (degree celsius ° C.) |
| --- | --- |
| Zone I | 176 |
| Zone II | 180 |
| Zone III | 183 |
| Zone IV | 185 |
| Zone V | 190 |
| Zone VI | 173 |
| Adapter | 195 |

The rotating speed of an extrusion screw in the main engine is 9 rpm, and the rotating speed of a feeding screw is 25 rpm, the torque is 39%, and the melting pressure is 330 bar.

The auxiliary engine is a single screw plastic extruder, and the auxiliary engine has three heating zones, two co-extrusion heads and one die head, wherein:

temperature of zone I is 240° C., the temperature of zone II is 240° C., the temperature of zone III is: 240° C., the temperature of the adapter is 240° C.

The auxiliary engine has two co-extrusion heads in total, wherein the heating temperature of the co-extrusion head I is 240° C., and the heating temperature of the co-extrusion head II is 240° C. Temperature parameters of the die head are that: the temperature of zone I is 200° C., the temperature of zone II is 200° C., the temperature of zone III is 200° C., and the temperature of zone IV is 200° C.

Embodiment 3

The raw materials of base material with PVC as a main part and their proportions are as follows:

| Raw material name | Mass fraction |
| --- | --- |
| PVC | 100 |
| Stabilizer | 3 |
| Modifier | 6 |
| Stain | 9 |
| Filler | 8 |
| Processing agent | 1.5 |
| Pigment | 0.035 |

The main raw materials of an intermediate enhancement material co-extrusion layer and their proportions are as follows:

| Raw material name | Mass ratio (%) |
| --- | --- |
| PBT material | 74 |
| Enhanced fiberglass | 26 | wherein, the stabilizer is an organic tin stabilizer; the modifier is an acrylic ester modifier; the stain is titanium dioxide; the filler is calcium carbonate or talc powder; the processing agent is acrylic ester; and the pigment is phthalocyanine blue.

The main engine is a double screw plastic extruder, wherein the extruder has six heating zones and an adapter, and the working temperatures of each heating zone and the adapter are as follows:

| Heating zone | Temperature (degree celsius ° C.) |
| --- | --- |
| Zone I | 172 |
| Zone II | 175 |
| Zone III | 176 |
| Zone IV | 182 |
| Zone V | 184 |
| Zone VI | 173 |
| Adapter | 185 |

The rotating speed of an extrusion screw in the main engine is 8 rpm, and the rotating speed of a feeding screw is 23 rpm, the torque is 37%, and the melting pressure is 320 bar.

The auxiliary engine is a single screw plastic extruder, and the auxiliary engine has three heating zones, two co-extrusion heads and one die head, wherein:

temperature of zone I is 230° C., the temperature of zone II is 230° C., the temperature of zone III is: 230° C., the temperature of the adapter is 230° C.

The auxiliary engine has two co-extrusion heads in total, wherein the heating temperature of the co-extrusion head I is 240° C., and the heating temperature of the co-extrusion head II is 240° C. Temperature parameters of the die head are that: the temperature of zone I is 185° C., the temperature of zone II is 185° C., the zone III is 185° C., and the zone IV is 185° C.

Embodiment 4

The raw materials of base material with PVC as a main part and their proportions are as follows:

| Raw material name | Mass fraction |
|---|---|
| PVC | 100 |
| Stabilizer | 3 |
| Modifier | 11 |
| Stain | 9 |
| Filler | 5 |
| Processing agent | 1 |
| Pigment | 0.025 |

The main raw materials of an intermediate enhancement material co-extrusion layer and their proportions are as follows:

| Raw material name | Mass ratio (%) |
|---|---|
| PBT material | 65 |
| Enhanced fiberglass | 35 | wherein, the stabilizer is an organic tin stabilizer; the modifier is a CPE modifier; the stain is titanium dioxide; the filler is kaolin or wollastonite; the processing agent is acrylic ester; and the pigment is phthalocyanine blue.

The main engine is a double screw plastic extruder, wherein the extruder has six heating zones and an adapter, and the working temperatures of each heating zone and the adapter are as follows:

| Heating zone | Temperature (degree celsius ° C.) |
|---|---|
| Zone I | 173 |
| Zone II | 179 |
| Zone III | 182 |
| Zone IV | 185 |
| Zone V | 189 |
| Zone VI | 176 |
| Adapter | 194 |

The rotating speed of an extrusion screw in the main engine is 8 rpm, and the rotating speed of a feeding screw is 23 rpm, the torque is 36%, and the melting pressure is 32 bar.

The auxiliary engine is a single screw plastic extruder, and the auxiliary engine has three heating zones, two co-extrusion heads and one die head, wherein:

temperature of zone I is 230° C., the temperature of zone II is 230° C., the temperature of zone III is: 230° C., the temperature of the adapter is 230° C.

The auxiliary engine has two co-extrusion heads in total, wherein the heating temperature of the co-extrusion head I is 240° C., and the heating temperature of the co-extrusion head II is 240° C. Temperature parameters of the die head are that: the temperature of zone I is 185° C., the temperature of zone II is 185° C., the temperature of zone III is 185° C., and the temperature of zone IV is 185° C.

The foregoing descriptions are merely preferred embodiments of the present invention, but are not intended to limit the protection scope of the present invention. Any equivalent replacement or modification figured out by those skilled in the art within the technical scope disclosed by the present invention and according to the technical solution and concepts of the present invention shall all fall within the protection scope of the present invention.

The invention claimed is:

1. A method for producing a self-enhancement plastic profile, wherein said self-enhancement plastic profile comprises a PVC substrate and a fiberglass-containing PBT resin, wherein the PVC substrate resin and the fiberglass-containing PBT resin are co-extruded, wherein the PVC substrate comprises a PVC resin, a stabilizer, a modifier, a stain, a filler, a processing agent, and a pigment at mass fractions of 100, 3-8, 4-11, 3-6, 5-10, 1-4, and 0.015-0.045, respectively wherein the stabilizer is a lead based stabilizer, a calcium/zinc stabilizer or an organic tin stabilizer, the modifier is a CPE modifier or an acrylic ester modifier, the stain is titanium dioxide, the filler is kaolin, wollastonite, calcium carbonate or talc powder, the processing agent is acrylic ester, and the pigment is ultramarine or phthalocyanine blue;

wherein the fiber-glass containing PBT resin forms one or more enhancement bars in the self-enhancement plastic profile, comprises 45-75% mass ratio of a PBT material and 25-55% mass ratio of fiberglass, the method comprising:

employing a main extruder and an auxiliary extruder vertically arranged to the main extruder;

extruding the PVC substrate using the main extruder and extruding the fiberglass-containing PBT resin using the auxiliary extruder simultaneously to form an extrudate;

pre-profiling the extrudate; and cold-cutting the pre-profiled extrudate into a predetermined size, wherein the main extruder is a double screw plastic extruder comprising six heating zones, and an adapter, wherein temperatures of the heating zones are: zone I: 172-176° C., zone II: 175-180° C., zone III: 176-183° C., zone IV: 182-187° C., zone V: 184-190° C., zone VI: 172-176° C., wherein a temperature in the adapter is 185-195° C., wherein, in the main extruder, a rotating speed of an extrusion screw in the main engine is 7-9 rpm, and a rotating speed of a feeding screw is 18-25 rpm, a torque is: 32-39%, and a melting pressure is 310-330 bar;

wherein the auxiliary extruder is a single screw extruder comprising three heating zone and an adapter, wherein temperatures of the heating zones are: zone I: 220-240° C., zone II: 220-240° C., zone III: 220-240° C., wherein the temperature in adapter is 220-240° C., wherein the auxiliary extruder comprises two co-extrusion heads, wherein a heating temperature of a first co-extrusion head is 220-240° C., and a heating temperature of second co-extrusion head is 220-240° C., and wherein temperatures of a die head in the auxiliary extruder are: zone I: 185-200° C., zone II: 185-200° C., zone III: 185-200° C., and zone IV: 185-200° C.

* * * * *